United States Patent
Lee et al.

(10) Patent No.: US 12,394,786 B2
(45) Date of Patent: Aug. 19, 2025

(54) ELECTRODE, SECONDARY BATTERY COMPRISING ELECTRODE AND METHOD FOR PREPARING ELECTRODE

(71) Applicant: SK On Co., Ltd., Seoul (KR)

(72) Inventors: Jong Hyuk Lee, Daejeon (KR); Hee Gyoung Kang, Daejeon (KR); Mi Ryeong Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 619 days.

(21) Appl. No.: 17/710,448

(22) Filed: Mar. 31, 2022

(65) Prior Publication Data
US 2022/0320502 A1  Oct. 6, 2022

(30) Foreign Application Priority Data
Apr. 2, 2021 (KR) ........................ 10-2021-0043065

(51) Int. Cl.
*H01M 4/36* (2006.01)
*H01M 4/02* (2006.01)
*H01M 4/04* (2006.01)

(52) U.S. Cl.
CPC ......... *H01M 4/366* (2013.01); *H01M 4/0471* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 8,277,520 B2 | 10/2012 | Inoue et al. | |
| 11,404,692 B1* | 8/2022 | Lanning | H01M 4/62 |
| 11,557,755 B2* | 1/2023 | Jo | H01M 4/0404 |
| 11,996,539 B2* | 5/2024 | Lee | H01M 4/625 |
| 2012/0258359 A1 | 10/2012 | Saka | |
| 2016/0093888 A1* | 3/2016 | Oyama | H01M 4/5825 429/231 |
| 2018/0097255 A1* | 4/2018 | Jung | H01M 4/04 |
| 2019/0036125 A1* | 1/2019 | Schroder | H01G 11/28 |
| 2019/0363351 A1* | 11/2019 | Ota | H01M 4/483 |

(Continued)

FOREIGN PATENT DOCUMENTS

| | | |
|---|---|---|
| CN | 109301160 A | 2/2019 |
| JP | 2010-218954 A | 9/2010 |

(Continued)

OTHER PUBLICATIONS

Extended European Search Report for the European Patent Application No. 22165786.9 issued by the European Patent Office on Aug. 29, 2022.

*Primary Examiner* — Kevin M Bernatz
(74) *Attorney, Agent, or Firm* — IP & T GROUP LLP (57) ABSTRACT

An electrode and a method of manufacturing the electrode are provided. The electrode includes an electrode current collector and an electrode active material layer on at least one surface of the electrode current collector. The electrode active material layer has a thickness of 200 μm or more, and when the electrode active material layer is divided into three portions of a surface layer portion, a middle layer portion, and a lower layer portion in a thickness direction, a difference in porosity between the surface layer portion and the lower layer portion by XRM analysis is 10% or less.

5 Claims, 5 Drawing Sheets

(56) References Cited

U.S. PATENT DOCUMENTS

| | | | | |
|---|---|---|---|---|
| 2020/0212428 A1* | 7/2020 | Han | .................... | H01M 4/0471 |
| 2020/0350555 A1* | 11/2020 | Park | ...................... | C01G 53/00 |
| 2023/0075385 A1* | 3/2023 | Jo | ........................ | H01M 4/667 |
| 2025/0023020 A1* | 1/2025 | Maas | .................... | H01M 4/386 |

FOREIGN PATENT DOCUMENTS

| | | |
|---|---|---|
| JP | 2011-134550 A | 7/2011 |
| JP | 2015-185403 A | 10/2015 |

\* cited by examiner

ELECTRODE, SECONDARY BATTERY COMPRISING ELECTRODE AND METHOD FOR PREPARING ELECTRODE

CROSS-REFERENCE TO RELATED APPLICATION (S)

This application claims the benefit below 35 USC 119 (a) of Korean Patent Application No. 10-2021-0043065 filed on Apr. 2, 2021 in the Korean Intellectual Property Office, the entire disclosure of which is incorporated herein by reference for all purposes.

BACKGROUND

1. Field

The present disclosure relates to an electrode and a method of manufacturing the electrode, and more particularly, to a thick film multilayer electrode and a method of manufacturing the same, and further to a secondary battery including the electrode.

2. Description of Related Art

In the related art method of manufacturing an electrode, an active material slurry including an active material, a binder, a conductive agent and a solvent is prepared, applied to the surface of a current collector, dried and rolled, thereby manufacturing the electrode. In this case, the active material slurry is prepared by adding a solvent so that the concentration of the solid content is a level of 40 to 50% by weight, but in this case, it takes a lot of time and money to uniformly dissolve the binder.

On the other hand, in operation of coating the active material slurry on the current collector to form an electrode having a multilayer structure, a method of coating the current collector with slurries having the same or different compositions at the same time through two or more coating nozzles, and then drying is applied.

However, in manufacturing the electrode having such a multilayer structure, the amount of solvent used may be increased to secure coating fluidity of the active material slurry. Therefore, there is a problem in that the costs due to the increased use of a solvent (NMP or the like) increases and the time and process costs for drying a large amount of solvent increase.

In addition, since the liquid active material slurry has a relatively low viscosity and thus has high fluidity, it may be difficult to coat the active material layer as a thick film, thereby limiting the energy density improvement. Even in the case of forming a multilayer electrode, since a fluid in which materials may be exchanged is formed at the interface between upper and lower coating layers, material movement of a binder or the like occurs thereat. There is a problem in that accurately implementing a required electrode having a multilayer structure is difficult.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a method for economically manufacturing an electrode and an active material slurry composition therefor.

An aspect of the present disclosure is to provide a method of manufacturing a thick-film electrode, in which a high-energy-density cell may be manufactured, and to provide an active material slurry composition therefor.

An aspect of the present disclosure is to provide a method of manufacturing an electrode and an active material slurry composition, in which various required performances of batteries may be obtained and an electrode having a multi-layer structure may be easily manufactured.

According to an aspect of the present disclosure, an electrode includes an electrode current collector and an electrode active material layer on at least one surface of the electrode current collector. The electrode active material layer has a thickness of 200 μm or more, and when the electrode active material layer is divided into three portions of a surface layer portion, a middle layer portion, and a lower layer portion in a thickness direction, a difference in porosity between the surface layer portion and the lower layer portion by XRM analysis is 10% or less.

The electrode may have a weight loss ratio of 2.5 wt % or more between TGA 200 and 500° C.

The electrode active material layer may be a multilayer film of two layers or more, and in the multilayer film, at least one of a component of an active material composition, a binder content of any one layer, and a thickness of each layer may be different from the other layer.

The electrode may be a negative electrode.

According to an aspect of the present disclosure, a secondary battery includes an electrode assembly including a positive electrode, a negative electrode, and a separation film interposed between the positive electrode and the negative electrode. At least one of the positive electrode and the negative electrode is the electrode described above.

According to an aspect of the present disclosure, a method of manufacturing an electrode includes preparing an active material dough by heating and kneading an active material composition including an electrode active material and a binder; forming an active material film by spreading the active material dough; and bonding by providing a current collector on one surface of the active material film.

The active material composition may include 15 to 45 wt % of a solvent.

The method of manufacturing an electrode may further include removing at least a portion of the solvent by heating under vacuum, degassing and drying after preparing the active material dough.

The forming of the active material film may be performed under heating in a temperature range of 110 to 200° C.

An adhesive layer may be formed on one surface of the active material film or the current collector, and the active material film and the current collector may be bonded to each other.

The adhesive layer may include a conductive resin.

The adhesive layer may further include at least one of a conductive carbon material and a metal material.

The current collector may be a conductive film having a thickness of 0.1 to 5 μm.

The conductive film may be a resin coating layer containing a conductive agent, or a metal film formed by ion sputtering, plasma coating or sol-gel coating.

Two single-sided electrodes having an active material film bonded to one surface of the conductive film may be stacked such that the conductive films face each other, and may be heated and pressed, to manufacture a double-sided electrode.

The active material film may be a multilayer film of two or more layers.

In the multilayer film, at least one of a component of an active material composition of any one layer, a binder content of the anyone layer, a thickness and a porosity of each layer may be different from the other layer.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but may include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

In manufacturing an electrode according to an embodiment of the present disclosure, without using a liquid active material slurry of the related art containing a large amount of solvent, an active material dough that does not contain a solvent or contains a small amount of solvent may be used. Therefore, it can be confirmed that at least the above objectives may be obtained according to an embodiment of the present disclosure.

The method of manufacturing an electrode according to an embodiment of the present disclosure includes preparing an active material dough without using a solvent or using a small amount of solvent, and preparing an active material film by spreading the active material dough. Hereinafter, the present disclosure will be described in more detail.

In the present disclosure, the active material dough is used instead of using the liquid active material slurry of the related art. The active material dough refers to a state in which it has fluidity when external force is applied at room temperature, but has little fluidity by itself, for example, there is no fluidity due to gravity.

Figure 1:
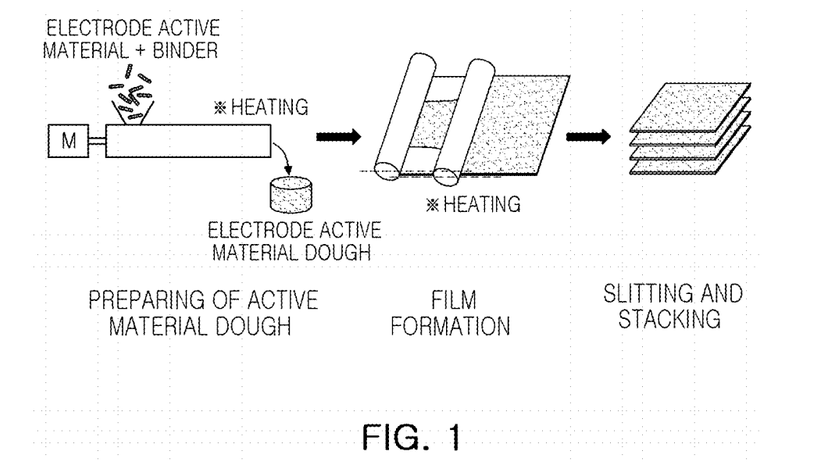
FIG. 1 is a view schematically illustrating an example of a method of manufacturing an electrode according to an embodiment of the present disclosure.

The active material dough according to an embodiment of the present disclosure may be obtained by kneading an active material composition that contains an electrode active material and a binder and does not contain a solvent or a small amount of solvent so as not to exhibit fluidity in the case of containing a solvent. A method of manufacturing an electrode according to an embodiment of the present disclosure is schematically illustrated in FIG. 1, and will be described in detail with reference to FIG. 1.

According to an embodiment, a method of manufacturing an electrode is provided, and the method may be applied to both the production of a positive electrode and a negative electrode, and the electrode active material and binder used in manufacturing the electrode of the positive electrode and the negative electrode may be suitably used in the present disclosure as long as they are commonly used.

For example, in the case of manufacturing a positive electrode, as the positive active material, a compound (a lithiated intercalation compound) capable of reversible insertion and desorption of lithium may be used. For example, at least one of composite oxides of a metal selected from cobalt, manganese, nickel, and combinations thereof with lithium may be used.

As a more detailed example, a lithium transition metal compound (oxide) having a layered structure may be used and represented by the general formula $LiMO_2$, wherein M includes at least one of transition metal elements such as Ni, Co and Mn, and may further include another metal element or a non-metal element. As the composite oxide, for example, a monolithic lithium transition metal composite oxide containing one type of the transition metal element, a so-called binary lithium transition metal composite oxide containing two types of the transition metal elements, and a ternary lithium transition metal composite oxide containing Ni, Co and Mn as constituent elements and transition metal elements may be used. In detail, a ternary lithium transition metal composite oxide such as $Li(Ni_{1/3}Co_{1/3}Mn_{1/3})O_2$ may be used.

In addition, as a lithium transition metal compound (oxide) represented by the general formula $Li_2MO_3$, wherein M includes at least one of transition metal elements such as Mn, Fe and Co and may further include another metal element or a non-metal element, for example, $Li_2MnO_3$, $Li_2PtO_3$, and the like may be used.

Also, a solid solution of the $LiMO_2$ and the $Li_2MO_3$, for example, a solid solution represented by $0.5LiNiMnCoO_2$-$0.5Li_2MnO_3$ may be used.

Furthermore, as the positive electrode, the positive active material having a coating layer on the surface thereof may be used, or a mixture of the compound and a compound having a coating layer may be used. The coating layer may include at least one coating element compound selected from the group consisting of oxide, hydroxide, oxyhydroxide, oxycarbonate, and hydroxycarbonate of the coating element. The compound constituting these coating layers may be amorphous or crystalline. As the coating element included in the coating layer, Mg, Al, Co, K, Na, Ca, Si, Ti, V, Sn, Ge, Ga, B, As, Zr, or mixtures thereof may be used.

The binder binds the positive active material particles to each other and serves to bind the positive active material to the positive electrode current collector. For example, fluorine resins, such as polyvinyl alcohol, carboxymethyl cellulose, hydroxypropyl cellulose, diacetyl cellulose, polyvinyl chloride, carboxylated polyvinyl chloride, polyvinyl fluoride, polymer containing ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, PTFE or the like, may be used. The binder is not limited thereto, but may be used in an amount of 1 to 5 parts by weight based on 100 parts by weight of the positive active material.

Together with the binder, a thickener may be further included to impart viscosity, and as the thickener, a cellulose-based compound such as carboxymethylcellulose, hydroxypropylmethylcellulose, methylcellulose, or alkali metal salts thereof (alkali metal: Na, K or Li) may be used alone or a mixture of two or more cellulose-based compounds may be used. The thickener may be included in an amount of 0.1 to 3 parts by weight based on 100 parts by weight of the positive active material.

In addition, the positive active material composition of the present disclosure may further include a conductive agent, if necessary, and as the conductive agent, an electron conductive material may be suitably used as long as it is commonly used in the positive electrode of a secondary battery. For example, 1 type, or 2 or more types selected from carbon-based materials such as natural graphite, artificial graphite, carbon black, acetylene black, ketjen black, carbon fibers, carbon nanotubes, and graphene; metal powder such as copper, nickel, aluminum, and silver, or metal-based substances such as metal fibers; conductive polymers, such as a polyphenylene derivative may be used. The conductive agent may be used in an amount of 1 to 5 parts by weight based on 100 parts by weight of the positive active material.

In the present disclosure, the solvent is not included, but if necessary, a small amount of the solvent may be included. In the case of using the solvent, not only an aqueous solvent such as water, but also a non-aqueous solvent commonly used in manufacturing a positive electrode, such as N-methyl-2-pyrrolidone (NMP), may be used. The solvent may be included in an amount of 60 parts by weight or less, based on 100 parts by weight of the solid content of the positive active material composition. If the content of the solvent exceeds 60 parts by weight, the total solids concentration may be reduced to 60% by weight or less, resulting in a slurry, so that a dough is not formed and fluidity is exhibited. Therefore, it may be difficult to form a film in a subsequent process, or a problem of additionally drying the solvent may occur. In more detail, the content of the solvent may be in an amount of 45 parts by weight or less.

On the other hand, in the case of manufacturing the negative electrode, the negative active material is not particularly limited as long as it is commonly used in the production of the negative electrode of a lithium ion secondary battery, and may be suitably used in the present disclosure. The negative active material may be a carbon-based negative active material, such as artificial graphite or a mixture of artificial graphite and natural graphite, having a shape such as amorphous, plate-like, flake-like, spherical, and fiber-like; a Si-based negative active material such as an alloy of elements selected from the group consisting of Si, Si—C composite, $SiO_x$ ($0<x<2$), Si and alkali metals, alkaline earth metals, Group 13 elements, Group 14 elements, Group 15 elements, Group 16 elements, transition metals, rare earth elements, and combinations thereof; an Sn-based negative active material such as an alloy with elements selected from the group consisting of Sn, $SnO_2$, Sn and alkali metals, alkaline earth metals, Group 13 elements, Group 14 elements, Group 15 elements, Group 16 elements, transition metals, rare earth elements, and combinations thereof; or a lithium-vananium oxide negative active material, and any one thereof may be used alone, or a mixture of two or more types may be used.

The binder binds the positive active material particles to each other and also serves to bind the positive active material to the positive electrode current collector. Examples of the binder may include fluorine-based resins, such as styrene-butadiene rubber, acrylated styrene-butadiene rubber (SBR), acrylonitrile-butadiene rubber, acrylic rubber, butyl rubber, ethylene-propylene copolymer, polyepichlorohydrin, polyphosphazene, polyacrylonitrile, polystyrene, ethylene-propylene-diene copolymer, polyvinylpyridine, chlorosulfonated polyethylene, latex, polyester resin, acrylic resin, phenolic resin, epoxy resin, polyvinyl alcohol resin, acrylate-based resin, and PTFE, and one type or two or more types of aqueous binders such as the above fluorine resins or the like may be used. The content of the binder may be included in an amount of 1 to 5 parts by weight based on 100 parts by weight of the negative active material.

Together with the binder, a thickener may be further included to impart viscosity, and examples of the thickener may include a cellulose-based compound such as carboxymethyl cellulose, hydroxypropyl methyl cellulose, methyl cellulose, or alkali metal salts thereof, and as the thicknener, one type thereof or a mixture of two or more types thereof may be used. The thickener may be included in an amount of 0.1 part by weight to 3 parts by weight based on 100 parts by weight of the negative active material.

The conductive agent is used to impart conductivity to the electrode, and may be used without limitation as long as it is commonly used in secondary batteries, and the conductive agent used in the positive electrode may also be used in the negative electrode. The conductive agent may be used in an amount of 1 to 5 parts by weight based on 100 parts by weight of the negative active material.

Furthermore, the negative active material composition does not contain a solvent, but may contain a small amount of the solvent if necessary. The solvent allows the binder to be evenly applied to the surface of the active material. In detail, the solvent may be mixed with the binder to dissolve the binder and then may be mixed with the active material.

In this case, the solvent may be included in an amount such that the active material dough has fluidity to allow for minimal plastic deformation. In detail, the solvent may be included in an amount of 45 wt % or less based on 100 wt % of the solid content of the negative active material composition. If the content exceeds 45% by weight, it may be slurried, and thus, the dough may not be formed and fluidity may be exhibited. Therefore, it may be difficult to form a film in a subsequent process or a problem of additionally drying the solvent may occur. In the present disclosure, since the solvent may not be included, the lower limit of the solvent is not particularly limited, but if a solvent is used, the solvent may be included in an amount of 15% by weight or more.

As the solvent, not only an aqueous solvent such as water, but also a non-aqueous solvent commonly used for preparing the negative electrode slurry of a secondary battery, such as N-methyl-2-pyrrolidone (NMP), may be used.

Figure 2:
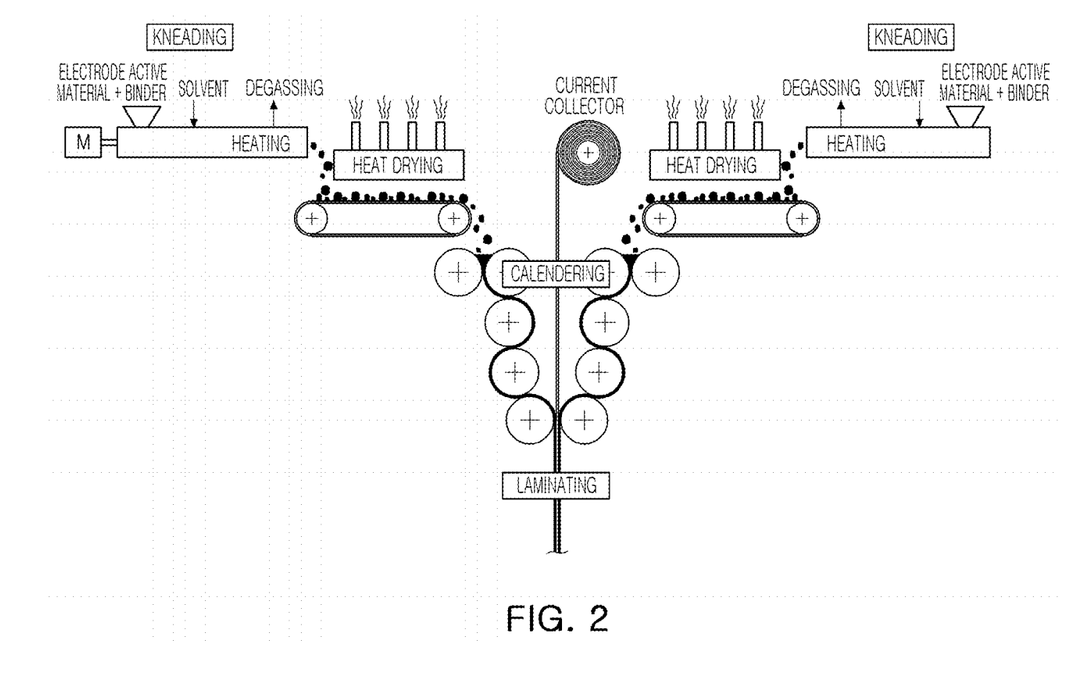
FIG. 2 is a view schematically illustrating another example of the method of manufacturing an electrode according to an embodiment of the present disclosure.

An active material dough is prepared by using the active material composition including the active material of the positive or negative electrode as described above. As a method for producing the active material dough, as illustrated in FIGS. 1 and 2, by kneading by applying a high shear stress while heating to a predetermined temperature, the active material dough may be produced. The kneading may be performed using a device capable of kneading by applying a high shear stress, for example, a continuous high shear stress mixer or an intermittent high shear stress mixer may be used, and in detail, a twin extruder, a planetary mixer, a tri mixer, or the like may be used.

In this case, the heating is performed to evenly apply the binder to the active material, and may be performed in a temperature range of 50 to 90° C., and by heating in the above temperature range, the binder may be softened, and may be more evenly applied onto the surface of the active material.

Figure 3:
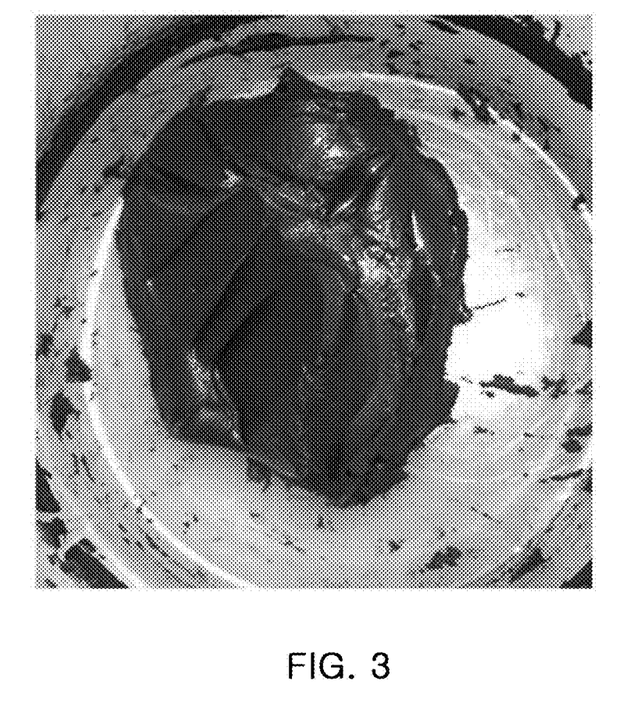
FIG. 3 is an image of the state of an active material dough according to the present disclosure, obtained in Example 1.

By kneading under such high shear stress, the binder in the active material composition is softened and the viscosity thereof is reduced due to heat and shear stress in the active material composition having no fluidity, and the active material dough as illustrated in FIG. 3 is obtained. FIG. 3 is an image obtained by capturing the state of the active material dough that is obtained according to an example of the present disclosure. The active material dough according to the present disclosure is in a state like clay, and has fluidity to a degree that it may flow when a predetermined external force is applied.

In the case in which the active material composition includes a solvent, the solvent in the dough may be removed by performing degassing and vacuum drying during or after preparing the active material dough by the heating and kneading. This is schematically illustrated in FIG. 2. In order for the binder to be evenly applied to the active material and to have a minimum fluidity, a solvent is added to knead the mixture of the active material and the binder, and in this case, bubbles may be generated between particles. These bubbles may prevent the binder from being densely applied to the particle surface of the active material, and thus, may be removed by degassing. It may be preferable to significantly increase the uniform kneading effect through such degassing. The degassing is not particularly limited, and as illustrated in FIG. 2, the degassing may be performed by kneading in a vacuum state.

Meanwhile, the addition amount of the solvent may be added in excess of the target amount, and in this case, the particles become denser during the degassing process, resulting in much more wetness and dilution, which may inhibit the film formation process. Therefore, it may be desirable to remove some of the solvent used. The solvent removal may be performed by heating to a temperature near the boiling point of the solvent used, and the removal method is not particularly limited. The amount of removal of a solvent is not particularly limited in this case, but may be adjusted suitable to the extent which may maintain a dough state.

Next, the method according to an embodiment of the present disclosure includes operation of forming an active material film by spreading the prepared active material dough. As illustrated in FIG. 1, an active material film may be formed by placing a predetermined amount of the active material dough on a predetermined substrate surface, rolling and pressing. The rolling applies pressure to the dough on the substrate to stretch and spread the dough, and an active material film having a predetermined thickness and width may be manufactured. In addition, although not particularly limited, for example, as illustrated in FIG. 2, a layer in the form of a film may be prepared by rolling between rolls, or by an extrusion process passing through a die, and in detail, the film may be manufactured using a calendering and laminating device or an extrusion or the like. Moreover, the film may also be manufactured by the method of using a mold, and the method is not particularly limited.

In this case, the film may be prepared on the surface of the current collector, and after the film is prepared, the laminating may be performed on the current collector.

The rolling may be performed in one step, and as illustrated in FIGS. 1 and 2, may be performed in a plurality of steps of two or more, but is not particularly limited. For example, as illustrated in FIG. 2, the active material film may be prepared by adjusting the distance between the axis of each roller and the substrate to perform two-step rolling to stretch the dough step by step. As illustrated in FIG. 2, the active material film may be prepared by stretching the dough by rolling in the steps of two or more.

In preparing the active material film by the rolling, it may be preferable to heat to a predetermined temperature. The heating temperature may be 40° C. or higher. However, if the heating temperature is too high, the solvent may evaporate and the viscosity may decrease, and in this case, the film may be broken during the film formation process. Therefore, the heating may be performed at 120° C. or less, in detail, 80° C. or less. In more detail, is the heating may be performed at 40° C. or higher, as the boiling point of the solvent used or lower, and may be performed at the binder melting point or lower, for example, in the range of 40 to 80° C.

In this case, the substrate may be a current collector. In detail, by placing a predetermined amount of the active material dough on one or both surfaces of the current collector and spreading by rolling as described above, an active material film may be prepared on the surface of the current collector, thereby obtaining an electrode. The electrode may be manufactured by binding the active material film to the surface of the current collector by the binder included in the active material film.

The current collector is a metal having good conductivity, and the material commonly used when manufacturing a positive electrode or a negative electrode may be used in the present disclosure, and is not particularly limited. For example, in manufacturing the positive electrode, aluminum, nickel, titanium, stainless steel, or the like may be used as the positive electrode current collector. In addition, in manufacturing the negative electrode, the material selected from the group consisting of copper foil, nickel foil, stainless steel foil, titanium foil, nickel foam, copper foam, a polymer substrate coated with a conductive metal, and combinations thereof may be used as the negative electrode current collector. Each of the electrode current collectors may have various shapes such as a sheet type, a thin type, and a mesh type, and the thickness thereof is not particularly limited, but may be, for example, 5 to 30 μm.

Furthermore, to increase the binding force between the active material film and the current collector, an adhesive layer may be formed on the surface of the current collector in advance. The adhesive layer may use a resin that provides adhesive strength, and the detailed type thereof is not particularly limited, but the adhesive layer may be formed using a conductive resin. Furthermore, the adhesive layer may include a conductive agent to increase conductivity. As the conductive agent, a conductive agent added to the active material composition may be used.

On the other hand, the active material film may be prepared on the surface of the current collector by placing the active material dough on a peelable substrate, for example, a substrate such as a release film, and spreading by rolling as described above. The substrate is peeled from the prepared active material film, and thus, may be understood that the substrate is not included.

Thereby, the active material film having no substrate may be manufactured, and the electrode may be manufactured using the prepared active material film.

As an example, the electrode may be manufactured by adhering the active material film to one or both surfaces of the electrode current collector as described above. The bonding is performed by heating and/or pressure, and the active material film or the electrode current collector may be adhered by the binder of the active material film. On the other hand, to improve the adhesion of the active material film or the electrode current collector, an adhesive layer as described above may be included on the surface of the electrode current collector, and further, the adhesive layer may be formed on the surface of the active material film, and may be formed on both. In addition, the adhesive layer may be formed on the entire surface of the electrode current collector or the active material film, and the adhesive layer may also be formed only on a portion of the electrode current collector or the active material film in the shape of dots, stripes, grids, or the like.

As another example of manufacturing an electrode, an electrode may be manufactured by forming a conductive film having conductivity on one surface of the active material film and using the same as a current collector. Thereby, a single-sided electrode is obtained, and a double-sided electrode may be manufactured by using the two single-sided electrodes as a pair, stacking the same such that the conductive films face each other, and bonding the films. In addition, after manufacturing the single-sided electrode, a double-sided electrode may be obtained by laminating an active material film not having a conductive film on the conductive film surface of the single-sided electrode, and then bonding by heating and/or pressurization. In manufacturing the double-sided electrode from the single-sided electrode as described above, the bonding may be performed using the adhesive layer as described above.

The conductive film may be a resin coating layer formed by coating a resin composition including a conductive agent. In this case, the resin may be a conductive resin, and the conductive agent may be the conductive agent as described above, and is not particularly limited.

In addition, the conductive film may be a metal foil. The metal foil may be formed by a method such as an ion sputtering method, a plasma coating method, or a sol-gel coating method.

The thickness of the conductive film may be, for example, 0.1 to 5 μm, and in more detail, 0.5 to 4 μm. If the thickness of the conductive film is less than 0.1 μm, the continuity of the conductive film is not guaranteed due to the space formed between the particles of the active material and thus the current collecting function may not be performed. If the thickness exceeds 5 μm, an excessively thick conductive film is formed, and thus, the advantage of energy density improvement through volume reduction, compared to using a metal foil as a current collector, may disappear.

The electrode may be manufactured by the method as described above, and an electrode tab may be formed on the conductive film formed on the surface of the current collector or the active material film in the process of manufacturing the electrode, if necessary.

According to the method of the present disclosure as described above, instead of using a liquid active material slurry, an electrode may be manufactured using an active material dough that does not contain a solvent or contains a small amount of a solvent to the extent that fluidity is not provided at room temperature. Therefore, a high-density electrode may be manufactured more easily. For example, a high-loading (g/cm$^2$) electrode may be manufactured by forming the active material film thick, and the thickness of the entire active material film may be increased by forming two or more active material films. For example, according to the method of the present disclosure, an electrode having a thickness of 200 μm or more, for example, 300 μm or more, 400 μm or more, or 500 μm or more, based on one-sided electrode may be manufactured.

As such, in the electrode according to an embodiment of the present disclosure, the thickness of the electrode active material layer may increase, thereby reducing the weight ratio of the current collector. In general, in a case in which an electrode is manufactured using a liquid active material slurry, an electrode active material layer formed on one surface of an electrode current collector has a thickness of about 100 μm on one side, and the electrode current collector has a weight specific gravity of about 20% or more with respect to the total weight of the electrode, by considering that the electrode active material layer is formed on both sides. However, in the electrode provided in the present disclosure, the thickness of the electrode active material layer may be significantly increased compared to the case of using the liquid active material slurry of the related art, and therefore, the weight ratio of the electrode current collector to the total weight of the electrode may be reduced to 20% or less, and for example, an electrode having a weight specific gravity of 2 to 20% may be obtained.

Furthermore, in the electrode according to an embodiment of the present disclosure, a weight loss ratio between TGA 200 and 500° C. may be 2.5 wt % or more. When the TGA analysis is performed in a temperature range of 200 to 500° C., the weight of the electrode is changed due to thermal decomposition of the binder, which is an organic material, and there is no change in weight due to the current collector. Therefore, the electrode manufactured using the liquid active material slurry of the related art has a relatively low weight loss due to thermal decomposition of the binder due to the high weight ratio of the electrode current collector to the total electrode. However, the electrode according to an embodiment of the present disclosure is a thick film electrode, in which a thickness of the electrode active material layer is 200 μm or more. In this case, with respect to an electrode having an electrode active material layer on both surfaces, the weight ratio of the electrode current collector is relatively low and the weight ratio of the binder is relatively high, so that the weight loss is as high as 2.5% by weight or more.

On the other hand, in the case of manufacturing the electrode by applying the electrode active material slurry on the current collector, using a large amount of solvent as in the manufacturing method of the related art, it may be difficult to maintain the coating layer to be a thick thickness due to the flow of the slurry because the ratio of the solvent is high, and it may be difficult to sufficiently relieve the stress on the pressure of the roll because the thickness is thin and thus the distance that solid particles such as active material moves during the rolling process is relatively short. Therefore, the deformation of the particles is caused, and the porosity decreases toward the center, thereby causing a porosity deviation depending on the thickness of the electrode active material layer.

However, in the electrode according to the present disclosure, the electrode active material layer may be formed as a thick film, and thus, the area in which the solid particles may move is increased, and stress may be effectively relieved even when the pressure by the double-sided roll is applied. Accordingly, the phenomenon of particle deformation is reduced even on the deep side of the electrode, thereby reducing the porosity deviation according to the position in the depth direction in the electrode active material layer and thus improving the quality of the electrode.

Figure 5:
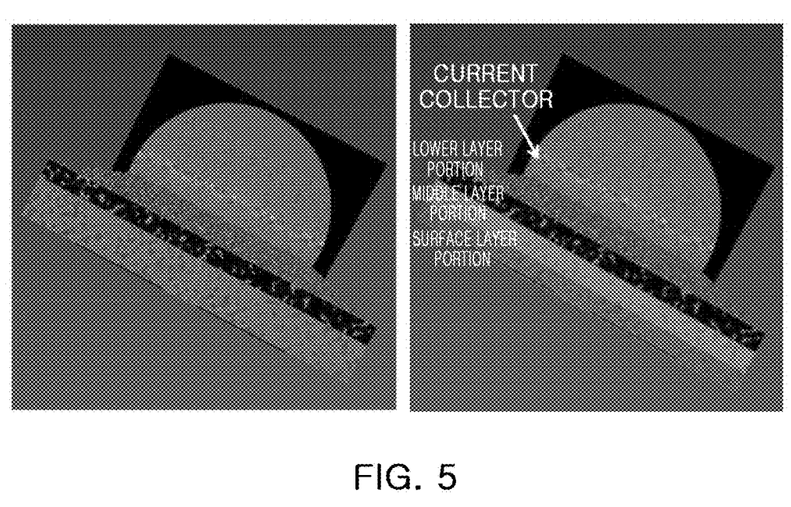
FIG. 5 is an image of 3D structure data of an electrode active material layer obtained using an X-ray microscope (XRM)

In the electrode provided in the present disclosure, the difference in porosity between a surface layer portion and a lower layer portion may be analyzed by dividing the electrode active material layer into three sections, for example, the surface layer portion, a middle layer portion, and the lower layer portion, in the thickness direction. For the porosity, 3D structure information as illustrated in FIG. 5 may be obtained using an X-ray microscope (XRM) for each region of the electrode active material layer, and the electrode structure may be analyzed for a predetermined region. According to the XRM analysis method, the porosity may be non-destructively analyzed for a predetermined space at the same location of the specimen of the electrode, and data is recorded as a three-dimensional volume pixel of the voxel concept, and thus, the porosity of each part of each electrode active material layer may be analyzed.

In setting the area for porosity measurement, the outermost electrode surface, for example, in the case of the surface layer portion of the electrode active material layer, a contact surface with external air may affect the porosity calculation. In addition, when measuring the porosity of a portion adjacent to the current collector, an error may occur in calculating the porosity due to physical properties of the current collector. Therefore, to prevent an error in porosity calculation, it may be preferable to exclude the surface layer portion of the electrode active material layer and the portion adjacent to the current collector from the porosity analysis target.

In detail, it may be preferable to measure the porosity by dividing into three regions of the surface layer portion, the middle layer portion, and the lower layer portion, except for the surface of the electrode active material layer and a thickness region of 10 μm, in detail, 15 μm, from the current collector toward the center of the electrode active material layer.

Accordingly, the selected analysis target area may be analyzed through XRM/Geodict SW analysis.

As such, the central portion of the electrode active material layer, except for the outermost portion of the electrode active material layer and a portion near the electrode current collector from the analysis target, is divided into three sections in the thickness direction, and the porosity is analyzed along the XYZ axis for each region from the outermost surface layer portion.

When the porosity of the electrode according to the present disclosure is analyzed by the method as described above, it represents the percentage of the difference between the porosity of the surface layer portion and the porosity of the lower layer portion relative to the porosity of the surface layer portion, and may be preferably 10% or less. If the difference in the porosity exceeds 10%, one of the surface layer portion and the lower layer portion, in detail, the pores of the lower layer portion may be clogged.

In a case in which this pore clogging phenomenon appears on the surface of the electrode active material layer, electrolyte impregnation is not smooth, and the probability that lithium metal precipitation occurs during rapid charging is relatively high. In a case in which the porosity decreases due to clogging of pores in the central portion adjacent to the substrate, the electrode resistance increases, and thus, relatively low power characteristics may be exhibited.

The porosity difference is illustrated with respect to the porosity between the surface layer portion and the lower layer portion, but the same characteristics as the above may also be exhibited between the surface layer portion, the lower layer portion, and the middle layer portion. In detail, the porosity difference between the surface layer portion and the lower layer portion may be 7% or less.

On the other hand, according to the method of the present disclosure, the manufacturing of a multilayer electrode may be facilitated by forming the active material film in two or more layers. The electrode obtained thereby may suppress material movement between layers, and an electrode having a clear interface between layers may be obtained. Thereby, the components of the active material composition, for example, the active material or binder, may be varied for respective layers, and the contents thereof may be different, and the thickness of respective layers may be different, thereby easily forming each active material film.

Therefore, different electrode characteristics of respective layers may be implemented, and thus, an electrode having required electrode characteristics may be manufactured. For example, in two adjacent layers of the electrode active material layer, the electrode characteristics of each active material layer may be rapidly changed by changing the composition of the active material. In detail, by changing the composition ratio of artificial graphite, natural graphite, amorphous carbon, or the like as the electrode active material, in each active material layer, the Id/Ig value indicating the crystal structure of carbon and the porosity may be changed.

The electrode according to the present disclosure may be one of a negative electrode and a positive electrode, and an electrode assembly may be manufactured using the negative electrode, the positive electrode, or the negative and positive electrodes. If necessary, after slitting the electrode into a required size, a negative electrode and a positive electrode are stacked, and a separator is interposed between the negative electrode and the positive electrode to prepare an electrode assembly, and a secondary battery may be manufactured by interposing and stacking a separator between the negative electrode and the positive electrode.

EXAMPLE

Hereinafter, the present disclosure will be described in more detail with reference to Examples of the present disclosure. The following examples are provided to illustrate the present disclosure in more detail by way of example, and are not intended to limit the present disclosure thereby.
Porosity Analysis Method
<XRM/GeoDict analysis>

The porosity of each area was analyzed using X-ray Microscope (XRM) and Math2Market's GeoDict software, on each area divided into three parts in the electrode thickness direction.

The XRM is used to secure a raw image of a monolayer of an electrode, and Zeiss's 520 (KAIST KARA) was used for pore analysis of the 3D negative electrode structure of sub-micron unit.

Analysis conditions were 1/2400 Angular Step, 350 nm Voxel size, 60 kV, 5 W X-ray energy. In addition, by applying the exposure time of 2.5 sec, about 2400 electrode tomographic raw images were obtained.

Then, GeoDict Software was used to convert the acquired raw image of the 2D tomography into a 3D image. This process is the same as making a virtual 3D digital electrode specimen structure with the same structure as the electrode specimen. Structural analysis was performed on the image of the formed 3D electrode specimen structure, and Geodict Software was used for all thereof.

The central portion, excluding the 10 μm thick region from the outermost portion of the electrode surface and 10 μm thick from the current collector surface, was divided into three parts: a surface layer portion, a middle layer portion, and a lower layer portion, and for each area, XRM analysis was performed from the outermost surface layer portion to the deepest part with X: 250 μm, Y: 300 μm, Z: 50 μm or more in the XYZ (thickness direction; direction perpendicular to the plane of the current collector) axis as the analysis area.

Example 1

A negative active material in which 30% by weight of rock type high-strength artificial graphite having a central particle diameter of 8 μm and 70% by weight of granular artificial graphite having a central particle diameter of 16 μm in the form of agglomerated plate particles are mixed was introduced into a twin extruder, which is a continuous kneader, at a rate of 20 kg/hr.

Then, a PVA/SWCNT/water solution in which 0.84 wt % of SWCNT is dispersed in a polyvinyl alcohol (PVA)/distilled water solution (5% concentration) having a weight average molecular weight of 145,000 or more and a degree of hydrolysis of 99% was added and stirred at a rate of 10.3 L/hr, and a 40 wt % SBR aqueous solution was added to the middle portion of the barrel and stirred, at a rate of 2 kg/h. In this case, the dough was prepared by stirring while maintaining the temperature of the barrel at 80° C.

The dough contains 93.47% by weight of active material, 2.39% by weight of PVA, 0.4% by weight of CNT and 3.74% by weight of SBR with respect to 100% by weight of solid content, and the solid content is 66.2% by weight.

The state of the prepared dough was photographed and illustrated in FIG. 3.

As illustrated in FIG. 2, the obtained dough is rolled/stretched in multiple stages between rolls and rolls whose surface is made of a PTFT material in a calendering facility to prepare a negative electrode mixture with a width of 10 cm and a thickness of 1,000 μm. A negative electrode was manufactured by bonding the negative electrode mixture and the Cu foil by passing the Cu foil as the current collector through and in contact with the roll on which the negative electrode mixture was formed.

Figure 6:
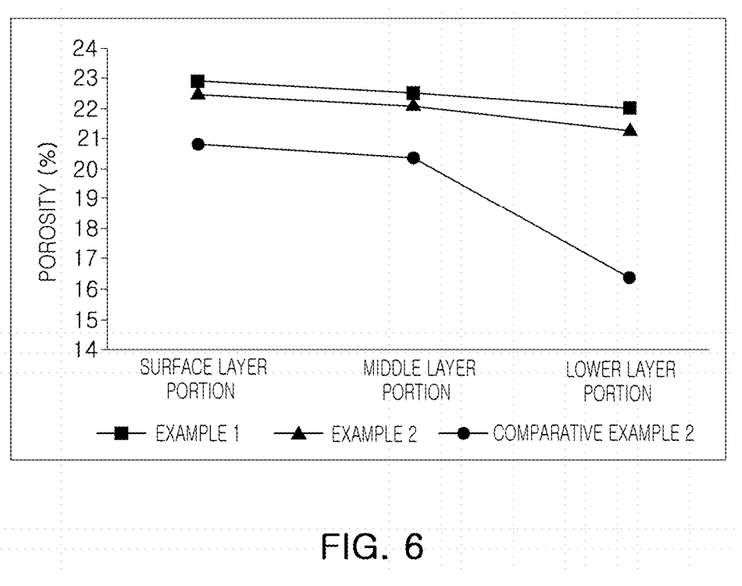
FIG. 6 is a graph illustrating the measurement of porosity for respective regions of electrode active material layers in the thickness direction, obtained in Examples 1 to 3 and Comparative Examples 2 and 3.

The thickness of the mixture layer, the electrode density, and the porosity of the obtained negative electrode were analyzed, and the results are illustrated in Table 1. In addition, the porosity analysis results are illustrated in FIG. 6.

Example 2

As a current collector, the negative electrode active material in which 30% by weight of high-strength artificial graphite in a lock-type shape with a central particle diameter of 8 μm, 30% by weight of artificial graphite having a central particle diameter of 16 μm in the form of agglomerated plate-shaped particles, and 40% by weight of spheroidized natural graphite having a central particle diameter of 11 μm are mixed in the first layer adjacent to the Cu foil, was added, in the same manner as in Example 1, and a negative electrode having a first negative electrode mixture having a thickness of 500 μm was prepared.

Then, a negative electrode having a negative electrode mixture having a two-layer structure was prepared in the same manner as in Example 2, except that the second negative electrode mixture was bonded to the first negative electrode mixture of the prepared negative electrode by using the same negative electrode active material as in Example 2.

The thickness of the mixture layer, the electrode density, and the porosity of the obtained negative electrode were analyzed, and the results are illustrated in Table 1, and the porosity analysis results are illustrated in FIG. 6.

Comparative Example 1

A negative active material having the same composition as in Example 1, 1.5% by weight of CMC, and 1.5% by weight of SBR were mixed, and a negative electrode slurry was prepared by adding a solvent such that the solid content concentration was 50% by weight. The obtained negative electrode slurry was photographed, and the image is illustrated in FIG. 4.

The negative electrode slurry was applied to the surface of the current collector to a thickness of 1000 μm and dried.

Figure 4:
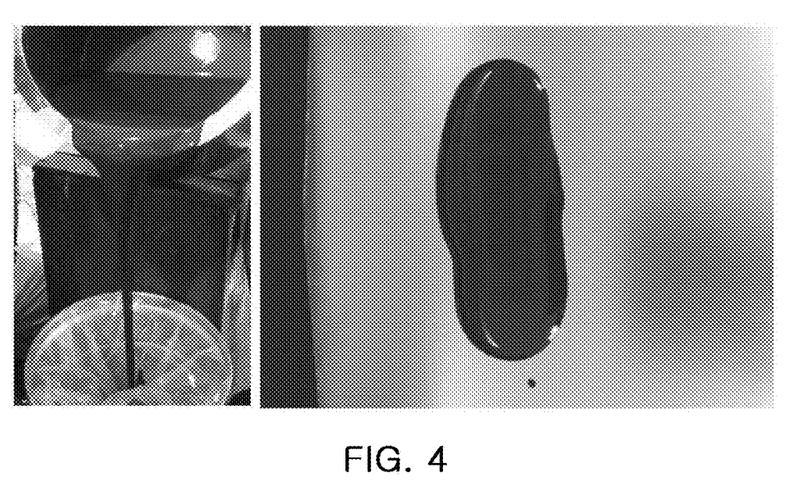
FIG. 4 is an image of a negative electrode slurry obtained in Comparative Example 1.

However, as illustrated in FIG. 4, the obtained negative electrode slurry had high flowability due to the high solvent ratio, and thus, it was difficult to maintain the coating layer, and the active material layer was severely cracked due to the process of drying a large amount of solvent, and thus, it was impossible to manufacture the electrode.

Accordingly, the electrode manufacturing was stopped.

Comparative Example 2

Using the same negative electrode slurry as in Comparative Example 1, the negative electrode slurry was applied to a thickness of 500 μm on the surface of the current collector, dried and rolled to prepare a negative electrode.

The thickness of the mixture layer, the electrode density, and the porosity of the obtained negative electrode were analyzed, and the results are illustrated in Table 1, and the porosity analysis results are illustrated in FIG. 6.

TABLE 1

| | Coating Thickness (μm) | Final mixture thickness (μm) | Electrode Density (g/cc) | XRM Porosity (%, SOC 0% after conversion) | | |
|---|---|---|---|---|---|---|
| | | | | Surface layer portion | Middle layer portion | Lower layer portion |
| Example 1 | 1000 | 703 | 1.68 | 22.9 | 22.5 | 22 |
| Example 2 | 500 | 345 | 1.68 | 22.5 | 22.1 | 21.3 |
| Comparative Example 1 | 1000 | 695 | — | — | — | — |
| Comparative Example 2 | 500 | 177 | 1.68 | 20.8 | 20.4 | 16.4 |

From Table 1 and FIG. 6, the electrodes of Examples 1 and 2 showed a relatively small difference in porosity between the surface layer portion, the middle layer portion, and the lower layer portion.

Comparative Example 2 is an example of manufacturing an electrode by reducing the coating thickness of the electrode slurry to 500 μm. As a result, the electrode active material layer of the electrode manufactured through drying and rolling processes had a significant increase in thickness reduction, compared to Example 1.

From the depth area porosimetry results of the electrode active material layers illustrated in Tableland FIG. 6 for the electrode after rolling, obtained in Comparative Example 2, it could be seen that the porosity of the lower layer portion significantly decreased compared to the surface layer portion. This may be interpreted as a difference in the movable distance through which the stress may be resolved while the active materials move with respect to the linear pressure of the roll according to the difference in the thickness of the electrode active material layer. For example, in the case of an electrode active material layer having a thick thickness, it may be understood that there are more areas in which particles may move to find an empty space and stress may be effectively relieved, whereas in the case of a thin mixture, the area itself for movement thereof is small so that the porosity of the lower layer portion is eventually reduced as the deformation of the particles occurs because it is difficult to properly relieve the stress due to the pressure.

As set forth above, according to an embodiment of the present disclosure, compared to a method of manufacturing an electrode using a liquid active material slurry having a high solvent content, the amount of solvent may be reduced, resulting in a material cost saving effect, as well as shortening the drying process execution time. Therefore, the electrode manufacturing process may be more efficient such as reducing the process costs.

According to an embodiment, even when a multilayer electrode is manufactured, material exchange at the interface between the layers, which appears in the case of manufacturing a multilayer electrode using a liquid active material slurry of the related art, does not occur. Accordingly, electrodes having different interlayer electrode properties may be manufactured.

According to an embodiment, the thickness of the electrode may be easily increased, such that the thick-film electrode may be easily manufactured, thereby improving the energy density of cells.

Furthermore, according to the thick thickness of the electrode, the use of the current collector may be reduced in implementing the same battery capacity, such that the energy density may be improved, and the cost reduction effect may be obtained.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electrode comprising:

an electrode current collector and an electrode active material layer on at least one surface of the electrode current collector, wherein the electrode active material layer has a thickness of 200 μm or more, and when the electrode active material layer is divided into three portions of a surface layer portion, a middle layer portion, and a lower layer portion in a thickness direction, a difference in porosity between the surface layer portion and the lower layer portion by XRM analysis is 10% or less, and wherein the electrode has a weight loss ratio of 2.5 wt % or more between TGA 200 and 500° C.

2. The electrode of claim 1, wherein the electrode active material layer is a multilayer film of two layers or more, and in the multilayer film, at least one of a component of an active material composition, a binder content of any one layer, and a thickness of each layer is different from the other layer.

3. The electrode of claim 1, wherein the electrode is a negative electrode.

4. A secondary battery comprising:

an electrode assembly including a positive electrode, a negative electrode, and a separation film interposed between the positive electrode and the negative electrode, wherein at least one of the positive electrode and the negative electrode is the electrode according to claim 1.

5. The secondary battery of claim 4, wherein the electrode active material layer is a multilayer film of two or more, and in the multilayer film, at least one of a component of an active material composition, a binder content of any one layer, and a thickness of each layer is different from the other layer.

* * * * *